United States Patent
Combes et al.

(10) Patent No.: US 7,048,233 B2
(45) Date of Patent: May 23, 2006

(54) DUAL CONDUCTION HEAT DISSIPATING SYSTEM FOR A SPACECRAFT

(75) Inventors: Charles Combes, Grepiac (FR); Jean-Luc Foucher, Seysses (FR); Pierre Jaubert, Tournefeuille (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/885,604

(22) Filed: Jul. 8, 2004

(65) Prior Publication Data

US 2005/0077432 A1  Apr. 14, 2005

(30) Foreign Application Priority Data

Jul. 11, 2003  (FR) ................................... 03 08520

(51) Int. Cl.
*B64G 1/56*  (2006.01)
(52) U.S. Cl. ..................... 244/171.8; 165/41
(58) Field of Classification Search ................. 244/163, 244/57, 117 A; 165/41
See application file for complete search history.

(56) References Cited

U.S. PATENT DOCUMENTS

| | | | | |
|---|---|---|---|---|
| 4,871,012 A | * | 10/1989 | Kuo | ........................... 165/41 |
| 5,036,905 A | * | 8/1991 | Eninger et al. | ................. 165/41 |
| 5,267,605 A | * | 12/1993 | Doty et al. | .................... 165/41 |
| 5,699,982 A | * | 12/1997 | Daugherty | ..................... 244/63 |
| 5,799,904 A | * | 9/1998 | Goodzeit et al. | ............ 244/163 |
| 5,806,803 A | * | 9/1998 | Watts | ......................... 244/163 |
| 5,859,498 A | * | 1/1999 | Durand et al. | .............. 315/5.38 |
| 5,862,462 A | * | 1/1999 | Tyner et al. | ................. 455/129 |
| 5,954,298 A | * | 9/1999 | Basuthakur et al. | ......... 244/163 |
| 6,073,888 A | * | 6/2000 | Gelon et al. | ................. 244/163 |
| 6,241,193 B1 | * | 6/2001 | Cassagne et al. | ............ 244/163 |
| 6,858,973 B1 | * | 2/2005 | Nugues et al. | ................. 313/37 |

FOREIGN PATENT DOCUMENTS

EP   0 687 627 A1   12/1995

* cited by examiner

*Primary Examiner*—Galen Barefoot
(74) *Attorney, Agent, or Firm*—Sughrue Mion, PLLC

(57) ABSTRACT

A system dedicated to dissipating heat produced by amplifier tubes of a spacecraft comprises a radiating panel installed substantially parallel to the amplifier tubes and thermally coupled to them to radiate to the outside a portion of the heat that they produce, a radiating receptacle whose walls define a housing adapted to receive the collectors of the amplifier tubes, and preferably a heat distributor that is preferably interleaved between the collectors and one wall of the receptacle to distribute the heat that the collectors produce between the collectors and the wall.

29 Claims, 2 Drawing Sheets

DUAL CONDUCTION HEAT DISSIPATING SYSTEM FOR A SPACECRAFT

CROSS-REFERENCE TO RELATED APPLICATIONS

This application is based on French Patent Application No. 03 08 520 filed Nov. 7, 2003, the disclosure of which is hereby incorporated by reference thereto in its entirety, and the priority of which is hereby claimed under 35 U.S.C. §119.

BACKGROUND OF THE INVENTION

1. Field of the Invention

The invention relates to the field of spacecraft and more particularly the systems used to dissipate heat produced by certain components (or equipment units) on board such craft.

2. Description of the Prior Art

The person skilled in the art is well aware that certain spacecraft comprise components such as traveling wave tubes for amplifying signals to be transmitted. Traveling wave tubes produce a large amount of heat which must be dissipated into space. To this end, a first proposal was to use heat transfer systems such as heat pipes or tubes for circulating a heat exchange fluid to couple the bodies of the traveling wave tubes thermally to a radiating panel for radiating the heat into space.

This proving insufficient, it was then proposed, in particular in U.S. Pat. No. 5,862,462, to couple the body of each traveling wave tube to a collector provided with a high-temperature radiator for radiating heat into space. The radiators being independent of each other, the tubes are virtually independent of each other from a radiating point of view, which is not beneficial in terms of dissipation, environment and mode of operation. This mode of thermal dissipation dissipates into space approximately 50% of the power produced in the saturation mode.

This is unsatisfactory given the ever increasing power that must be dissipated, which generally goes hand in hand with increasing complexity of the arrangements, especially on the east-west faces of the spacecraft (presence of large antenna reflectors and their support mechanism (hold on release mechanisms—HRMs), large send/receive sources and associated radiators, thruster supports, adjacent collectors, etc.), which significantly reduces the efficiency of radiation into space.

In other words, because of the insufficient dissipation of heat, and given the technological limitations of its traveling wave tubes, each spacecraft must be specifically configured and/or have the RF power of its payload limited.

Moreover, the dissipation mode described hereinabove imposes a dedicated environment for each traveling wave tube when testing the onboard equipment units.

An object of the invention is therefore to improve on the above situation.

SUMMARY OF THE INVENTION

To this end the invention proposes a heat dissipating system for a spacecraft comprising amplifier tubes comprising a body extended by a collector, the system comprising a radiating panel installed substantially parallel to the amplifier tubes and thermally coupled to their bodies in such a manner as to radiate to the exterior a portion of the heat that they produce and a radiating receptacle having walls defining a housing adapted to accommodate the collectors of the amplifier tubes and to be thermally coupled to the collectors by at least one of its walls so that heat that they produce is distributed over the wall and between the collectors.

Thus the amplifier tubes operate at two different conduction temperatures, namely a moderate temperature at the level of the tube bodies and a high temperature at the level of the tube collectors, but distributed and controlled by a radiating receptacle thermally coupled to said collectors.

According to another feature of the invention, the system further comprises at least one heat distributing means adapted to provide the thermal coupling between the collectors and one of the walls of the radiating receptacle and to distribute heat that the collectors produce between the collectors and over the wall. For example, the first heat distribution means may be interleaved between the collectors and one of the walls of the radiating receptacle. However, it may equally well be outside the radiating receptacle (and in contact therewith), or integrated into it.

This significantly improves and homogenizes the distribution of heat between the collectors and the wall.

In one preferred embodiment, the receptacle has three walls that define a "radiating trough" preferably of substantially U-shaped cross section. In this case, it is advantageous to provide another means of distributing heat, preferably interleaved between the collectors and another of the three walls of the receptacle and adapted to distribute the heat that the collectors produce between the collectors and the other wall. As in the first heat distribution means, the second heat distribution means may instead be outside the radiating receptacle (and in contact therewith), or integrated into it.

Moreover, each heat distribution means may take the form of at least one thermally conductive material rod, at least one heat pipe or at least one tube in which a heat exchange fluid circulates.

Furthermore, the receptacle is preferably made from a material chosen for its thermal and mechanical properties, such as aluminum.

According to another feature of the invention, the receptacle is preferably fastened to the collectors directly or indirectly.

The invention also provides a spacecraft comprising amplifier tubes and at least one heat dissipating system of the type described hereinabove. For example, the spacecraft comprises one or more heat dissipating systems provided with radiating receptacles (or rails) that are substantially parallel and, in operation, lie in planes substantially perpendicular to a north-south direction, and/or one or more heat dissipating systems provided with radiating receptacles (or rails) that are substantially parallel and, in operation, lie in planes substantially perpendicular to an east-west direction.

The invention is particularly well adapted to spacecraft such as satellites, in particular telecommunication satellites, but may also be installed on board remote sensing satellites, space probes, orbiting space stations and spaceships.

Other features and advantages of the invention will become apparent in the light of the following detailed description and the appended drawings.

DETAILED DESCRIPTION OF THE PREFERRED EMBODIMENT

Figure 1:
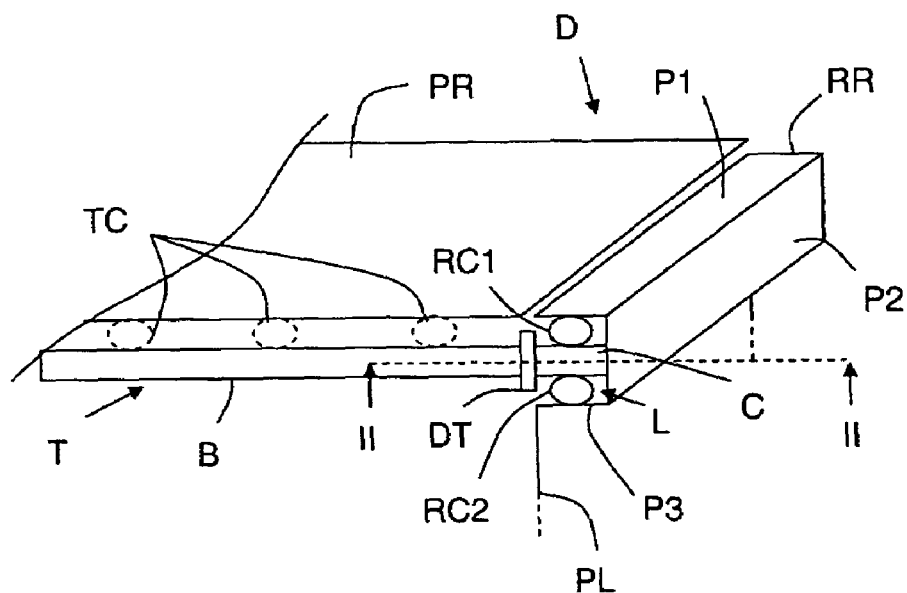
FIG. 1 is a diagram depicting a heat dissipating system according to the invention.

The appended drawings constitute part of the description of the invention and may, if necessary, contribute to the definition of the invention.

An object of the invention is to dissipate a large part of the heat produced by onboard amplifier tubes of a spacecraft.

In the present context the term "spacecraft" means any type of craft or vehicle traveling in space, either in orbit (low or high Earth orbit or geosynchronous orbit) or free of the gravitational field of the Earth, and adapted to transmit signals after amplifying them, and in particular satellites, especially telecommunication or remote sensing satellites, space probes, orbiting space stations and spaceships.

Hereinafter, by way of illustrative example, the spacecraft is a telecommunication satellite.

A telecommunication satellite comprises amplifier means for amplifying signals to be transmitted before they are transmitted to an Earth station. The amplifier means generally take the form of amplifier tubes, such as traveling wave tubes (TWT) T of the type depicted partly and very diagrammatically in FIGS. 1 to 3.

A traveling wave tube T conventionally comprises a body B, of generally parallelepiped shape, for example, connected to a collector C, for example in the shape of a cone or bowl or cylinder, preferably via a thermal decoupling element DT. The connection between these three portions of the tube T may be obtained by any means, and in particular by welding, adhesive bonding or nut and bolt fasteners.

The body B and the collector C are made from materials that are good conductors of heat, as opposed to the thermal decoupler DT, which is a poor conductor of heat to provide some thermal insulation between the body B, operating at a moderate temperature, and the collector C, operating at a high temperature. The thermal decoupler DT takes the form of a thermally insulative metal component, for example.

Unlike the prior art tubes, the tubes of the invention are not equipped with a collector provided with a radiator for radiating heat into space. Here, the collectors C of the tubes T are essentially conductive.

The bodies B of the tubes T are generally parallel to each other and are in thermal contact, for example by way of heat transfer means TC such as one or more heat pipes or heat exchange fluid tubes, with a radiating panel PR, made of aluminum, for example, for radiating into space the heat that it receives. Depending on the orientation of the satellite, the radiating panel PR is designated "north", "south", "east", or "west" according to which plane substantially perpendicular to one of these four directions it is installed in. For example, a satellite may comprise a north radiating panel and/or a south radiating panel and/or an east radiating panel and/or a west radiating panel.

For example, the tubes T thermally coupled to a north or south radiating panel PR are substantially parallel to the east-west direction.

Hereinafter the satellite is considered to comprise a north (or south) radiating panel substantially perpendicular to east and west lateral panels PL, for example covered with a multilayer insulation (MLI) material.

The radiating panel PR and the heat transfer means TC, where present, form part of a heat dissipating system D according to the invention that also comprises a radiating receptacle RR whose walls (P1–P3) define a housing L receiving the collectors C of the amplifier tubes T and which is thermally coupled to the collectors C by at least one of said walls P1 in order to distribute heat that they produce (and/or receive) between the collectors C and over the wall P1.

Figure 2:
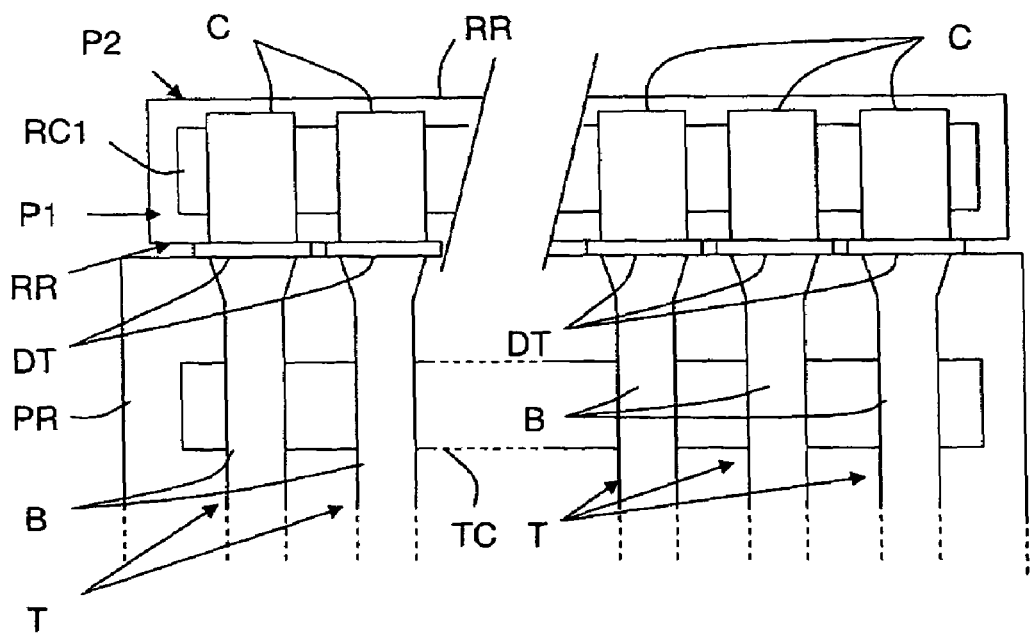
FIG. 2 is a view in section taken along the line II—II in FIG. 1.
Figure 3:
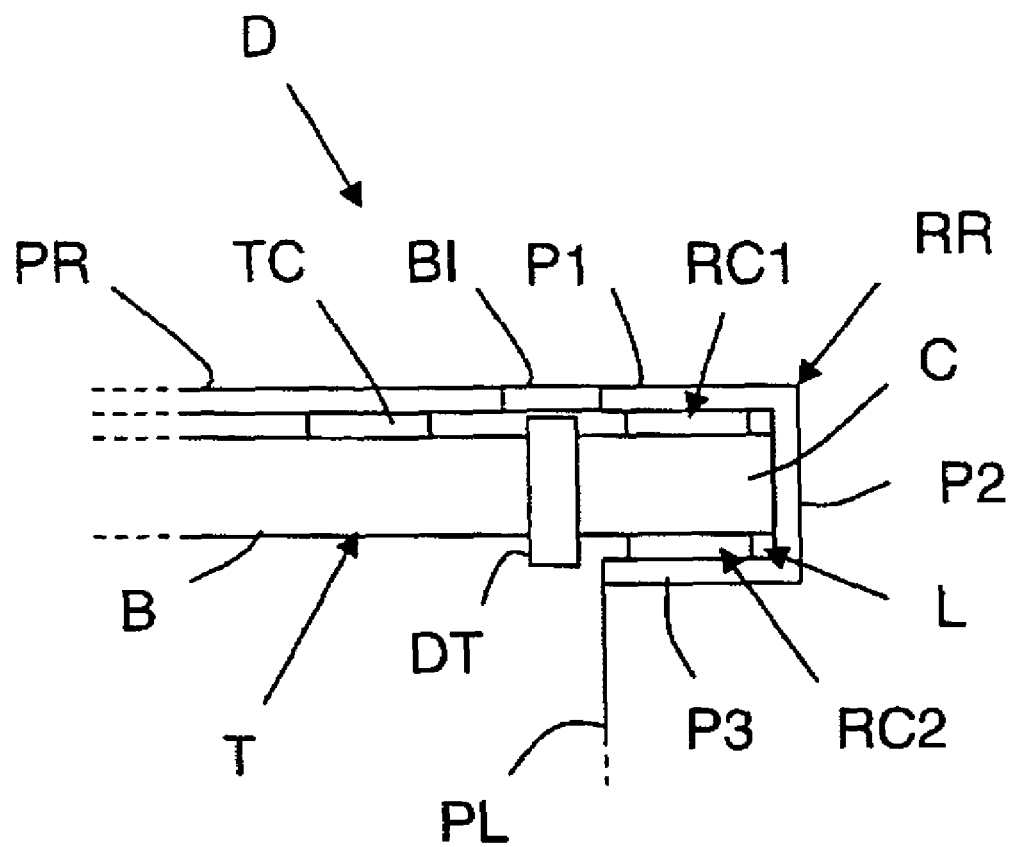
FIG. 3 is a diagrammatic side view depicting one embodiment of a portion of a heat dissipating system according to the invention.

In an example shown in FIGS. 1 and 3, the radiating receptacle RR comprises three walls P1, P2 and P3 that are substantially perpendicular in pairs and define a kind of trough or rail, preferably of substantially U-shaped cross section.

The radiating receptacle RR is made from the same radiating material as the radiating panel PR, for example.

Moreover, the radiating receptacle RR is preferably fastened to the collectors C either directly or indirectly, for example via heat distributing means (RC1, RC2) further described hereinafter.

Additionally, as shown in FIG. 3, it is advantageous to place an insulating strip BI, for example an MLI strip, in the space between the receptacle (or rail) RR and the panel PR.

Also, the radiating receptacle RR is preferably designed to be installed on the satellite so that it has a high space viewing angle, enabling it to dissipate heat efficiently.

As shown in FIGS. 1 and 3, in a preferred embodiment, the system D also comprises at least one heat distributing means RC1 preferably interleaved closely between the collectors C and one of the walls of the radiating receptacle RR and responsible for distributing heat that the collectors C produce (and/or receive) between the various collectors C and over the wall P1 with which it is in contact.

It is even more preferable if the system D comprises another heat distributing means RC2 that is preferably closely interleaved between the collectors C and another wall P3 of the radiating receptacle RR, for distributing the heat that the collectors produce (and/or receive) between the collectors C and over the wall P3 with which it is in contact.

In the example shown, the two heat distribution means RC1 and RC2 take the form of solid rods of a thermally conductive material such as aluminum, for example. However, the heat distribution means RC1 and RC2 could take the form of heat transfer systems such as heat pipes or tubes in which a heat exchange fluid circulates.

Placing between the collectors C and each of the heat distributors RC1, RC2 a sliding seal intended to limit thermo-elastic forces exerted on the amplifier tube T may also be envisaged. For example, a sliding seal of this kind may take the form of films of a thermally conductive material, such as a graphite-based material, for example.

Thanks to the invention, the system D provides dual conduction, firstly via the radiating panel PR in thermal contact with the body B of the amplifier tubes T and secondly via the radiating receptacle RR in thermal contact with the collectors C of said tubes T, preferably via the heat distributors RC. The first conduction therefore takes place at a moderate temperature at the level of the tube bodies and the other at a high temperature at the level of the tube collectors. This dual conduction is particularly efficient because the radiating receptacle (or rail) RR is thermally decoupled from the panel PR.

Moreover, the distribution of heat in accordance with the invention between the collectors C and the walls P1–P3 of the radiating receptacle RR:

reduces the temperature of the amplifier tubes T by a few tens of degrees Celsius, typically 30° C. to 40° C., which represents a 30% to 40% increase in the radiated power, enabling the RF power to be increased by approximately 20%, averages the thermal cycles over the whole of the heat dissipating system D, significantly reduces mechanical fatigue of the amplifier tubes T, reduces the constraints on the spacing between the amplifier tubes T, simplifies the mechanical/thermal interfaces during testing of the onboard equipment units in the spacecraft, and facilitates standardizing the mechanical and thermal interfaces of the tubes.

The invention is not limited to the embodiments of the heat dissipating system and spacecraft described hereinabove by way of example only, but encompasses all variants within the scope of the following claims that the person skilled in the art may envisage.

Thus there is described in the foregoing an application of the invention to telecommunication satellites. However, the invention is concerned generally with any type of spacecraft or space vehicle traveling in space and needing to dissipate heat energy produced by electronic components, such as signal amplifiers, and in particular remote sensing satellites, space probes, orbiting space stations and spaceships.

Moreover, there has been described a radiating receptacle (or rail) having a U-shaped section. However, the radiating receptacle (or rail) may have any shape, and in particular an angle-iron or trough shape.

Furthermore, there is described in the foregoing an embodiment in which the heat distributing means (RC1, RC2) are interleaved between the collectors and the walls of the radiating receptacles (or rails). However, a variant may be envisaged in which the heat distributing means are outside the receptacles, certain walls of the receptacles then having an inside face in contact with the collectors and an outside face in contact with the heat distributing means. In this case, the heat distributing means increase the radiating area of the collectors and distribute the heat between them via the wall of the radiating receptacle. Another variant may be envisaged in which at least one of the walls of the radiating receptacles (or rails) is at least partly hollow (or shaped) to integrate the heat distributing means (RC1, RC2).

Similarly, there has been described an embodiment in which the heat transfer means (TC) are interleaved between the bodies of the amplifier tubes and the radiating panel. However, a variant may be envisaged in which the heat transfer means are above the radiating panel, the latter then having an inside face in contact with the bodies and an outside face in contact with the heat transfer means. A further variant may be envisaged in which the radiating panel is at least partly hollow (or conformed) to integrate the heat transfer means (TC).

Finally, the system of the invention is not necessarily fixed. It may be at least partly mobile. For example, at least one of the walls of the radiating receptacle (or rail) may be folded during launch (or movement) and deployed during operation. It may also be envisaged that at least one of its walls has an area and/or a geometry that may be varied to control the efficiency of the dissipation system as a function of requirements.

The invention claimed is:

1. A heat dissipating system for a spacecraft comprising amplifier tubes comprising bodies extended by collectors, said system comprising a radiating panel installed substantially parallel to said amplifier tubes and thermally coupled to their bodies in such a manner as to radiate to the exterior a portion of the heat that they produce and a radiating receptacle having walls defining a housing adapted to accommodate said collectors of said amplifier tubes and to be thermally coupled to said collectors by at least one wall of the housing so that heat produced by said collectors is distriguted over said wall and between said collectors.

2. The system claimed in claim 1, further comprising at least one heat distributing means adapted to provide said thermal coupling between said collectors and one of said walls of said radiating receptacle and to distribute heat that said collectors produce between said collectors and over said wall.

3. The system claimed in claim 1 wherein said receptacle comprises three walls defining said housing.

4. The system claimed in claim 2 wherein said receptacle comprises three walls defining said housing, further comprising another heat distributing means adapted to provide said thermal coupling between said collectors and one of said walls of said radiating receptacle and to distribute heat that said collectors produce between said collectors and over said other wall.

5. The system claimed in claim 3 wherein said three walls define a housing having a substantially U-shaped cross section.

6. The system claimed in claim 2 wherein the at least one heat distributing means comprises at least one rod made from a thermally conductive material.

7. The system claimed in claim 2 wherein the at least one heat distributing means comprises at least one heat pipe.

8. The system claimed in claim 2 wherein the at least one heat distributing means comprises at least one tube in which a heat exchange fluid circulates.

9. The system claimed in claim 1 wherein said radiating receptacle is made from aluminum or magnesium.

10. The system claimed in claim 1 wherein said radiating receptacle is fastened to said collectors.

11. The system claimed in claim 2 wherein the at least one heat distribution means is interleaved between said collectors and one of said walls of said radiating receptacle.

12. The system claimed in claim 1 wherein each heat distributing means is outside said radiating receptacle and at least one of said walls of said receptacle has an inside face in contact with said collectors and an outside face in contact with said heat distributing means.

13. The system claimed in claim 1 wherein the at least one heat distributing means is integrated into a hollow portion of at least one of said walls of said receptacle.

14. The system claimed in claim 1 further comprising heat transfer means adapted to provide the thermal coupling of said radiating panel and said bodies of said amplifier tubes.

15. The system claimed in claim 14 wherein said heat transfer means comprise at least one heat pipe.

16. The system claimed in claim 14 wherein said heat transfer means comprise at least one tube in which a heat exchange fluid circulates.

17. The system claimed in claim 14 wherein said heat transfer means are interleaved between said radiating panel and said bodies of said amplifier tubes to provide the thermal coupling thereof.

18. The system claimed in claim 14 wherein said heat transfer means are outside said radiating panel, which has an inside face in contact with said bodies and an outside face in contact with said heat transfer means.

19. The system claimed in claim 14, wherein said heat transfer means are integrated into a hollow portion of said radiating panel.

20. A spacecraft comprising amplifier tubes comprising a body extended by a collector, which spacecraft comprises at least one heat dissipating system as claimed in claim 1.

21. The spacecraft claimed in claim 20 comprising at least two heat dissipating systems provided with substantially parallel radiating receptacles adapted to lie, in operation, in planes substantially perpendicular to a north-south direction.

22. The spacecraft claimed in claim 20, comprising at least two heat dissipating systems provided with substantially parallel radiating receptacles adapted to lie, in operation, in planes substantially perpendicular to an east-west direction.

23. The spacecraft claimed in claim 20 constituting a satellite, a space probe, an orbiting space station or a spaceship.

24. The heat dissipating system claimed in claim 3, wherein at least one wall of said receptacle may be deployable.

25. The heat dissipating system claimed in claim 1, wherein said radiating receptacle has at least one wall that may be varied to control efficiency of the dissipating system.

26. A heat dissipating system for a spacecraft, comprising:
   a traveling wave tube amplifier comprising bodies extended by collectors;
   a radiating receptacle having walls defining a housing adapted to accommodate the collectors of said amplifier; and
   thermal couplers connecting at least one of said walls to said collectors.

27. The heat dissipating system claimed in claim 26, wherein the radiating receptacle is thermally coupled to at least two connectors.

28. The heat dissipating system claimed in claim 26, further comprising a radiating panel thermally connected to the bodies of said traveling wave tubes.

29. The heat dissipating system claim in claim 28, wherein the radiating panel runs parallel to the bodies of said amplifier.

\* \* \* \* \*